(12) United States Patent
Doan

(10) Patent No.: US 7,357,053 B2
(45) Date of Patent: Apr. 15, 2008

(54) VEHICLE TIE ROD ADJUSTMENT DEVICE

(75) Inventor: Paul Doan, Macomb, MI (US)

(73) Assignee: Fori Automation, Inc., Shelby Township, MI (US)

( * ) Notice: Subject to any disclaimer, the term of this patent is extended or adjusted under 35 U.S.C. 154(b) by 99 days.

(21) Appl. No.: 11/425,282

(22) Filed: Jun. 20, 2006

(65) Prior Publication Data

US 2007/0289151 A1    Dec. 20, 2007

(51) Int. Cl.
*B25B 21/00* (2006.01)
*B25B 13/48* (2006.01)

(52) U.S. Cl. ............... 81/57.14; 81/57.24; 81/58.2

(58) Field of Classification Search .... 81/57.14–57.17, 81/57.19, 57.24, 57.3, 57.4, 58.2
See application file for complete search history.

(56) References Cited

U.S. PATENT DOCUMENTS

| | | | |
|---|---|---|---|
| 4,376,396 A | 3/1983 | Hayhoe | |
| 4,674,366 A | 6/1987 | Lauer et al. | |
| 4,679,327 A | 7/1987 | Fouchey et al. | |
| 5,027,275 A | 6/1991 | Sakamoto et al. | |
| 5,040,303 A | 8/1991 | Koerner | |
| 5,355,751 A | 10/1994 | Specht | |
| 6,308,593 B1 * | 10/2001 | Shibayama et al. | .......... 81/58.2 |

FOREIGN PATENT DOCUMENTS

DE           2644865 A1    4/1978

* cited by examiner

*Primary Examiner*—David B Thomas
(74) *Attorney, Agent, or Firm*—Reising, Ethington, Barnes, Kisselle, P.C.

(57) ABSTRACT

A vehicle tie rod adjustment device for changing the toe of a vehicle wheel by adjusting the overall length of a tie rod assembly. The tie rod adjustment device generally includes a housing, a gear train, an adjustable gear head, and a nut runner. The pivotal gear head threadably adjusts the tie rod assembly by rotatably engaging a hex or flatted portion and a lock nut, and includes one or more roller elements spaced around a guide fork recess to reduce a sliding friction with the tie rod assembly. According to another embodiment, the tie rod adjustment device includes a locking mechanism for maintaining the adjustable gear head in a proper alignment so that one or more components of the gear head can be removed.

20 Claims, 4 Drawing Sheets

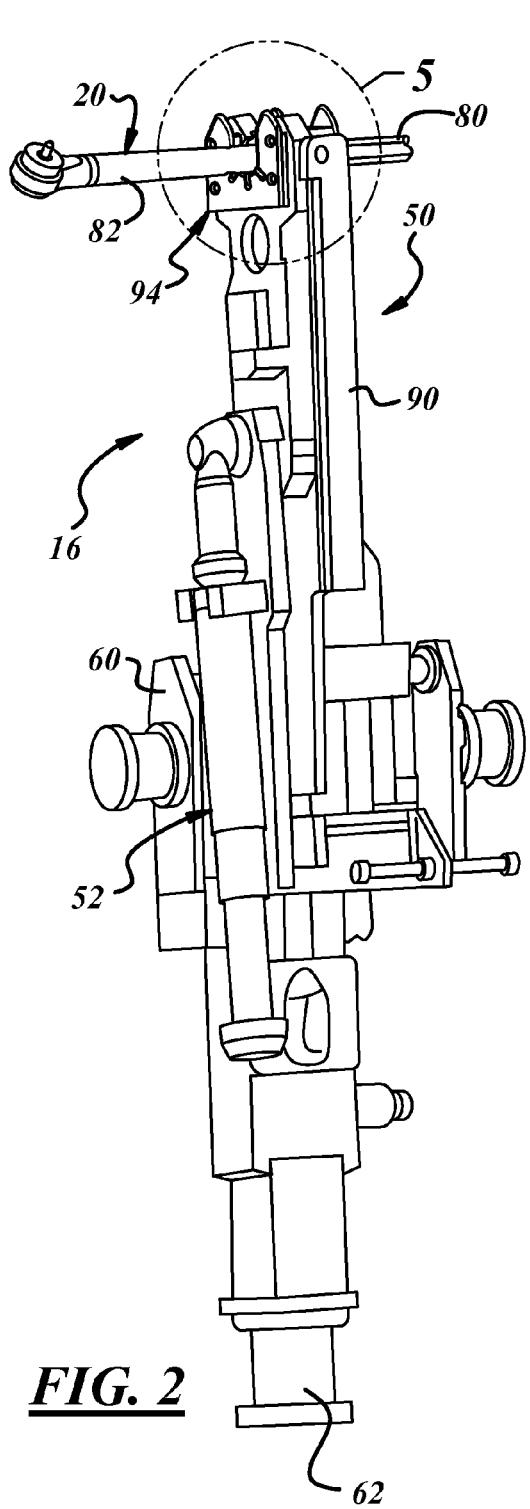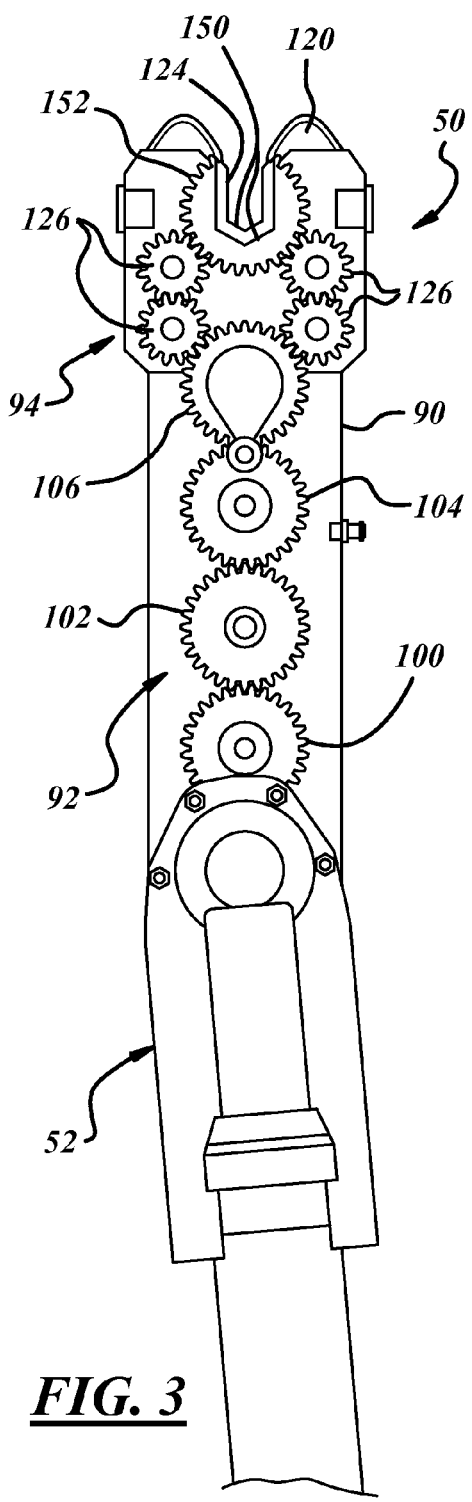
*FIG. 2*  *FIG. 3*

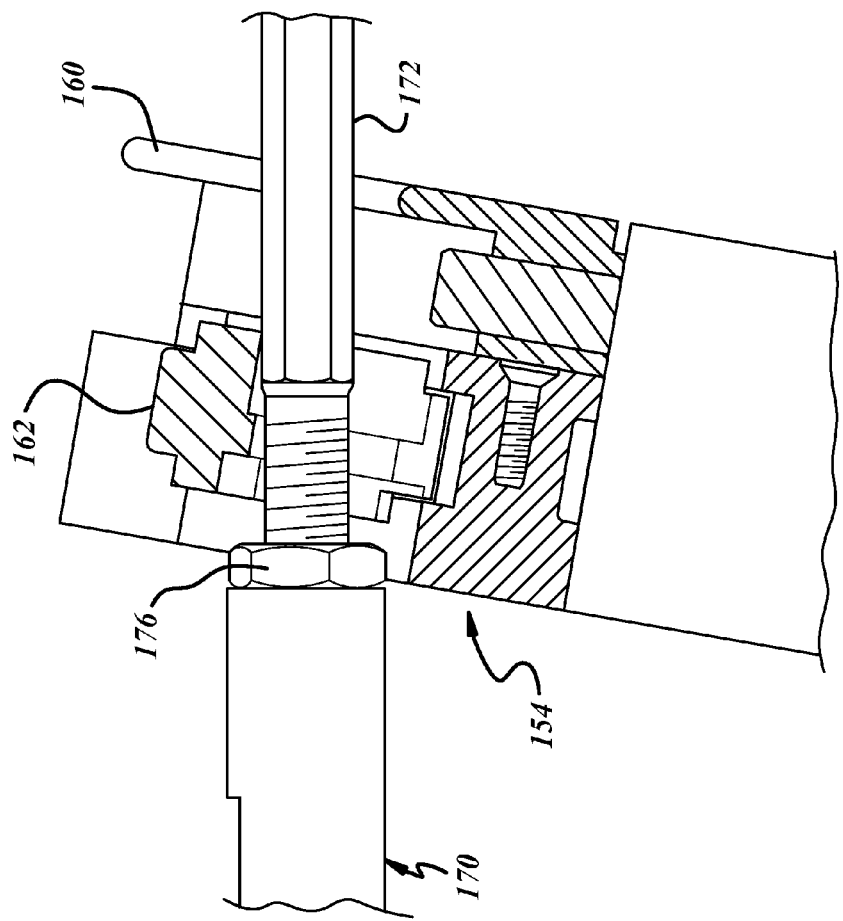
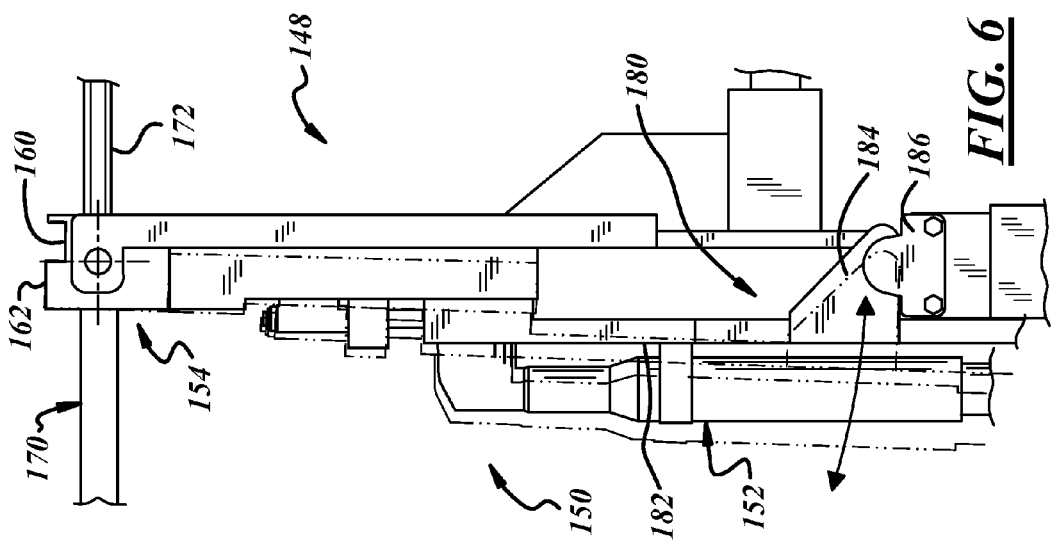

VEHICLE TIE ROD ADJUSTMENT DEVICE

TECHNICAL FIELD

The present invention generally relates to tie rod adjustment devices used on vehicle assembly lines and, more particularly, to tie rod adjustment devices that set the toe of the vehicle wheels by adjusting the overall length of the tie rods.

BACKGROUND OF THE INVENTION

Wheel adjustment and alignment is one operation in the manufacture of motor vehicles. Commonly, vehicle manufacturers have predetermined specifications for setting adjustable wheel alignment dimensions including caster, camber, and toe for a particular vehicle model. The toe dimension can be set using a vehicle tie rod adjustment device or power wrench to engage a vehicle tie rod assembly from below the vehicle undercarriage. Ordinarily, once engaged the tie rod adjustment device loosens a lock nut on the tie rod assembly, then moves laterally to engage a hex or flatted portion of an inner tie rod component, rotates the hex portion to adjust the overall length of the tie rod assembly, and then moves back to the lock nut to tighten it.

There are some challenges, however, to setting the toe dimension of the vehicle wheels in this manner. For instance, the vehicle tie rod assembly can be manufactured by methods that leave imperfections such as parting lines or other non-smooth features on its outer surface. These features can sometimes interrupt the tie rod adjustment device as it slides laterally along the tie rod assembly by creating undue friction between the two components. Furthermore, tight spatial constraints surrounding the undercarriage layout near the tie rod assembly oftentimes inhibit the lateral movement of the tie rod adjustment device and thus limit the size of the device that can be used.

SUMMARY OF THE INVENTION

According to one embodiment, there is provided a gear head for use with a vehicle tie rod adjustment device. The gear head includes a geared socket with an open recess for engaging a shaped portion or a lock nut of a vehicle tie rod assembly. The gear head also includes a guide fork that is located adjacent the geared socket and has an open recess with one or more roller element(s), wherein the roller element(s) facilitate a sliding movement between the guide fork open recess and the vehicle tie rod assembly.

According to another embodiment, there is provided a locking mechanism for use with a vehicle tie rod adjustment device, wherein the locking mechanism maintains an adjustable gear head in a particular position and comprises an arm component, a plate, and a retention device. The arm component is attached to and extends from the gear head, so that a pivotal movement of the gear head causes a corresponding pivotal movement of the arm component. The plate is attached to the arm component at a distance from the gear head. The retention device is attached to the tie rod adjustment device and is positioned to operably interact with the plate, so that engagement by the retention device of the plate causes the gear head to be locked in a particular angular position.

According to another embodiment, there is provided a tie rod adjustment station for use on a vehicle assembly line. The adjustment station includes tracks for supporting a vehicle, a wheel alignment sensing device, a movement mechanism, an electronic control system, and a tie rod adjustment device having a nut runner, a housing, a gear train, and a gear head.

BRIEF DESCRIPTION OF THE DRAWINGS

Preferred exemplary embodiments of the invention will hereinafter be described in conjunction with the appended drawings, wherein like designations denote like elements, and wherein:

FIG. 2 is a perspective view of one of the tie rod adjustment devices of FIG. 1 engaging a tie rod assembly;

FIG. 3 is an enlarged sectional side view of the tie rod adjustment device of FIG. 2, where the device has been sectioned to reveal components of a gear train and adjustable gear head;

FIG. 6 is a side view of another embodiment of a tie rod adjustment device, where this embodiment is similar to that previously shown but includes an adjustable gear head with one of the guide forks removed and a locking mechanism, and;

FIG. 7 shows an enlarged sectional side view of the gear head of FIG. 6, where the gear head has become misaligned with respect to the tie rod assembly.

DETAILED DESCRIPTION OF THE PREFERRED EMBODIMENTS

The vehicle tie rod adjustment device disclosed herein is generally used to set the toe dimension on the vehicle front wheels during manufacture, and is particularly useful for reducing frictional sliding forces between the device and the tie rod assembly, and for use in spatially limited applications.

Figure 1:
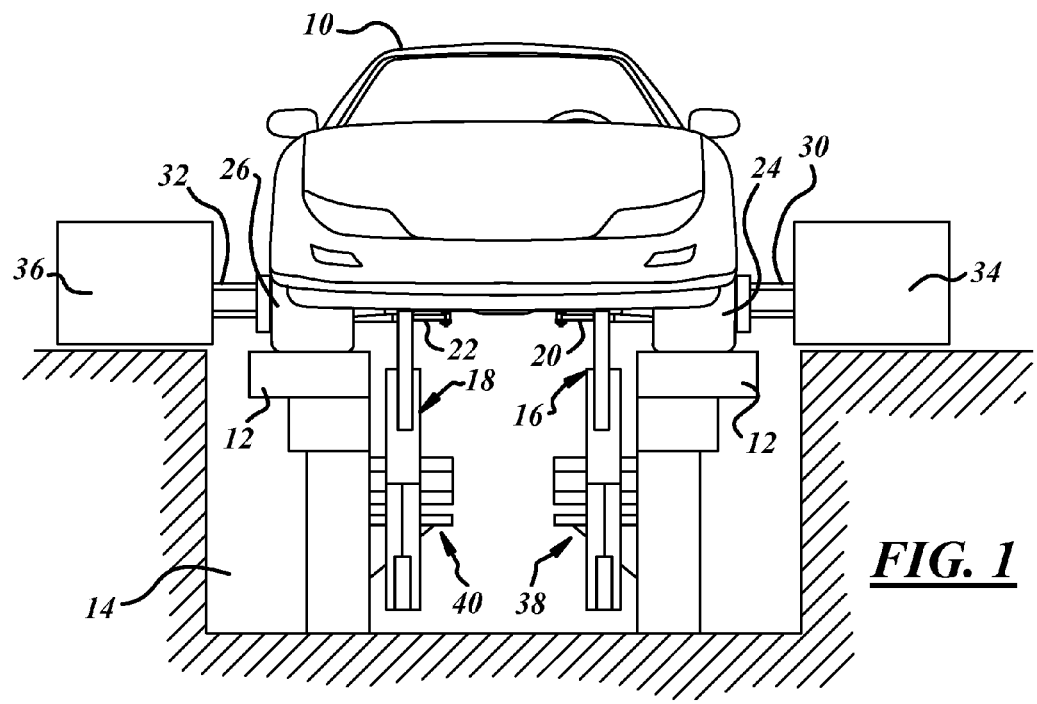
FIG. 1 shows a vehicle on an assembly line, where the vehicle is located on a pair of tracks above a pit so that a pair of tie rod adjustment devices have access to a pair of tie rod assemblies already mounted to the vehicle.

With reference to FIG. 1, there is shown a vehicle 10 on an assembly line, where the vehicle is securely positioned on a pair of tracks 12 so that it is located over a pit 14 that accommodates a pair of tie rod adjustment devices 16, 18. This type of arrangement provides devices 16, 18 with undercarriage access to a pair of tie rod assemblies 20, 22 so they can be adjusted and the toe of wheels 24, 26 can be set. In addition to tie rod adjustment devices 16, 18, the station shown in FIG. 1 can also include a number of additional pieces of equipment, such as wheel alignment sensing devices 30, 32, electronic control systems 34, 36, and movement mechanisms 38, 40. These additional pieces of equipment can be used in conjunction with tie rod adjustment devices 16, 18 to set the toe of the wheels, or they can be used independently to perform other non-toe adjustment related functions, as is appreciated by those skilled in the art.

Turning now to FIG. 2, there is shown an embodiment of tie rod adjustment device 16 which is designed for use on the driver-side tie rod assembly 20, but can be adapted for use on the passenger-side tie rod 22 as well. Generally, tie rod adjustment device 16 is designed to set the toe of the driver-side wheel 24 by adjusting the length of tie rod assembly 20 and locking that adjustment in place. According to the embodiment shown here, the tie rod adjustment device is attached to movement mechanism 38 by way of a mounting bracket 60 so that device 16 can be moved into and out of engagement with tie rod assembly 20. In some applications, simple horizontal and/or vertical movements may be all that is required for tie rod adjustment device 16 to engage tie rod 20, and in those cases a slide or lifting mechanism will suffice for movement mechanism 38. If more complex movement involving two or three axes, for example, is needed, then movement mechanism 38 may include a robot or other type of advanced movement device. It is also preferable that a cylinder 62, which can be powered by pneumatic, apply a constant force on tie rod adjustment device 16 so that it firmly engages tie rod assembly 20 throughout the operation. Such an engagement ensures that device 16 will not disengage or otherwise fall off the tie rod when it is being adjusted.

Tie rod adjustment device 16 adjusts the overall length of tie rod assembly 20, which sets the toe dimension of wheel 24, by threadably adjusting the position of inner and outer tie rod components 80, 82, with respect to one another. According to the embodiment shown here, the tie rod adjustment device generally includes a rigid housing 90 for receiving and protecting the internal components of the power wrench, a gear train 92 located within the housing, a floating gear head 94 pivotally connected to the end of the power wrench so that it is free to pivot in different directions, and a nut runner 96 for providing rotational power to the gear head. Various embodiments of housing 90 are known and understood in the art, any one of which could be used with the tie rod adjustment device.

Gear train 92 preferably includes a sequence of toothed gears that operably interact with one another to transfer rotational movement from the nut runner 96 to the gear head 94. As best demonstrated in FIG. 3, gear train 92 is generally located within housing 90 and includes a linearly aligned sequence of gears 100-106 extending from the nut runner 96 to the gear head 94. The first gear 100 in the sequence is designed to receive rotational movement from an output component of the nut runner, the second and third gears 102, 104 simply transfer rotational movement along the gear train, and the fourth and last gear 106 is designed to couple rotational movement to the gear head 94 across a pivotal or otherwise adjustable junction. Gear 106 interacts with smaller gears located in the gear head 94 and is designed to smoothly transfer rotational movement to the gear head, even when the gear head is pivoting with respect to the gear train. It should be appreciated that while a preferred gear train embodiment 92 is shown here, one of any number of other gear trains capable of providing gear head 94 with rotational movement could be used instead. For instance, gear train 92 could be modified to include a different number of gears, or it could include different types of gears, as is appreciated by those skilled in the art.

Figure 5:
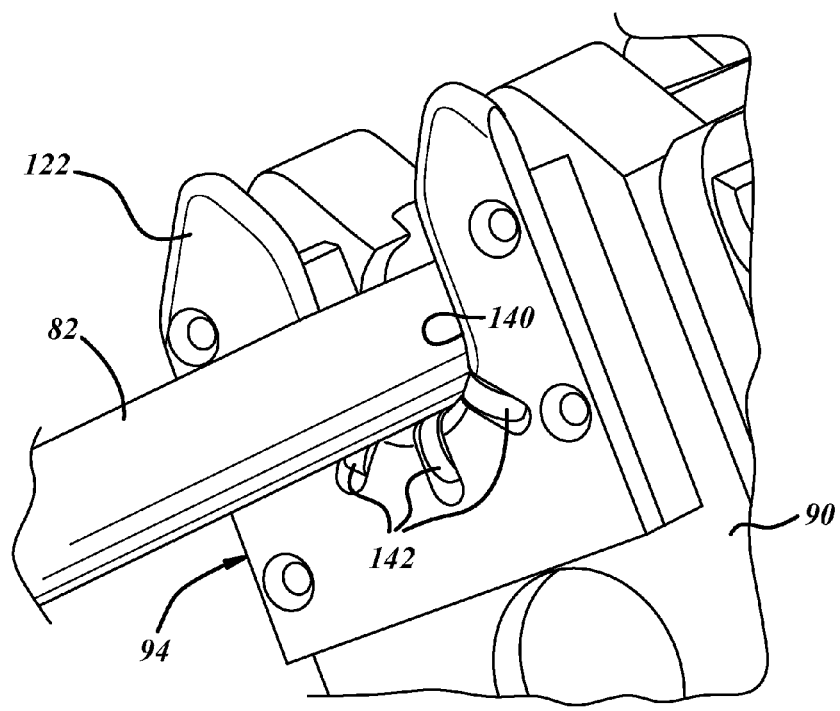
FIG. 5 is also an enlarged perspective view of the tie rod adjustment device of FIG. 2, where rolling features on the adjustable gear head allow for smooth movement along the tie rod assembly.
Figure 4:
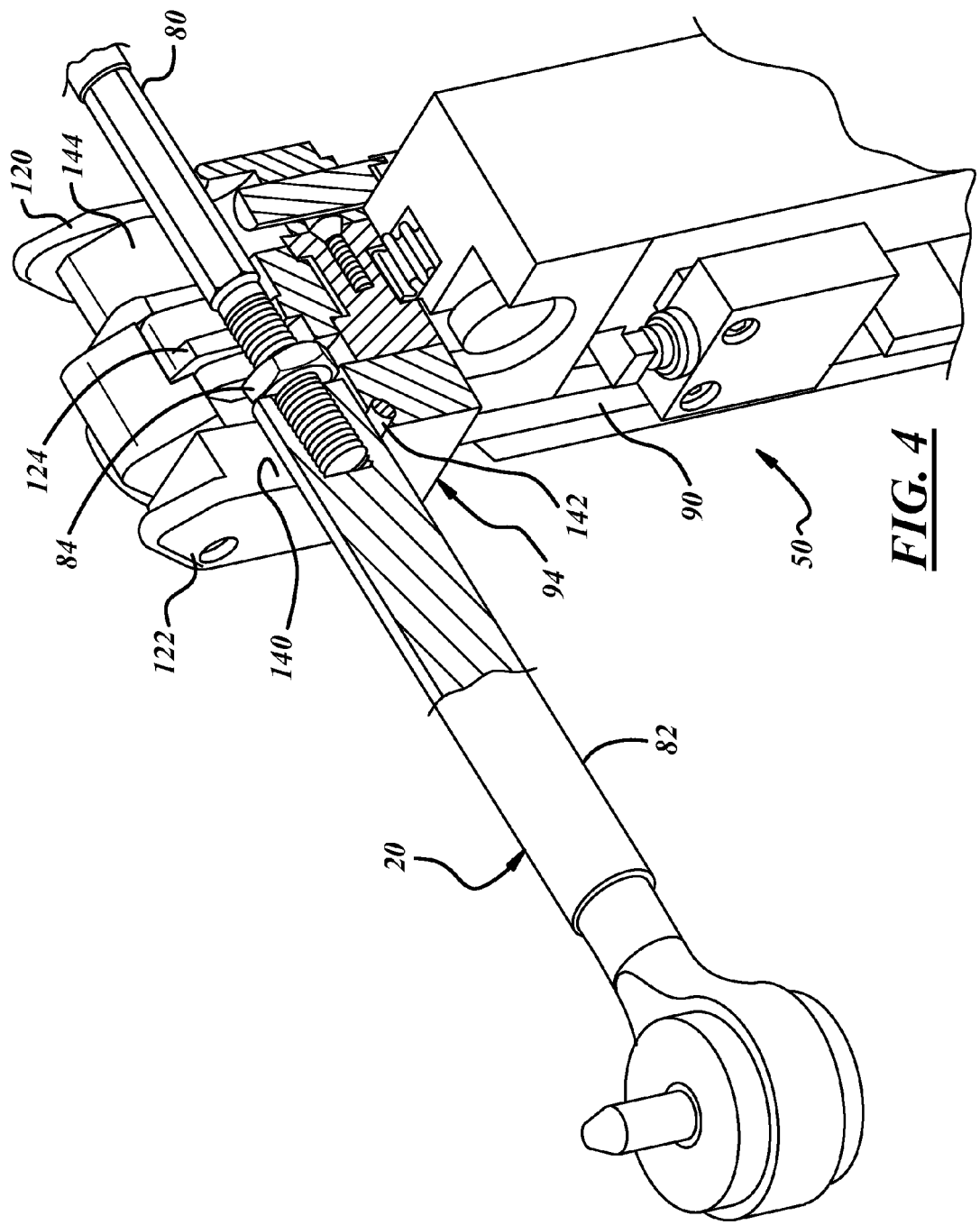
FIG. 4 is an enlarged perspective view of the tie rod adjustment device of FIG. 2, where some portions of a gear head and tie rod assembly have been sectioned to demonstrate engagement therebetween.

With specific reference to FIGS. 3-5, gear head 94 is pivotally mounted to the end of housing 90 and is designed to engage tie rod assembly 20 in order to adjust the toe of wheel 24. According to the embodiment shown here, gear head 94 generally includes inner and outer guide forks 120, 122, a geared socket 124, and several small internal gears 126. Guide forks 120, 122 are preferably U-shaped components that are located on opposing sides of geared socket 124 and are designed to help guide the gear head onto the tie rod assembly and to maintain a proper alignment during operation. Guide fork 122 includes an open-ended recess or hollow 140 which is sized and shaped to receive outer tie rod component 82, while guide fork 120 includes a similar open-ended recess 144 that is designed to interact with inner tie rod component 80. Although the following description is focused on guide fork 122, it should be appreciated that it can apply to guide fork 120 as well.

Preferably, the entire tie rod adjustment device 16 moves laterally along the length of tie rod assembly 20 during operation, so that there is a sliding interaction between recess 140 and the outer surface of tie rod component 82. In order to reduce the friction between these components and improve this sliding motion, several roller elements 142 are spaced around the periphery of recess 140. The roller elements can include any type of device designed to reduce friction between two moving parts including, but certainly not limited to, spring loaded and non-spring loaded: ball bearings, disk-shaped wheels, cylindrical bearings, conical bearings, etc. The roller elements shown in FIG. 5 include three disk-shaped wheels that are aligned with outer tie rod component 82 in a radial direction, thus allowing them to roll along the outer surface of component 82 in response to lateral movement of tie rod adjustment device 16. Roller elements 142 are particularly useful in situations where the outer tie rod component has a rough or scaly surface, or in cases where the cross-sectional shape of the component makes it difficult for the guide forks to slide along smoothly. It should of course be appreciated that the number, type, and placement of the roller elements can vary from those shown here, as these are merely exemplary embodiments.

Geared socket 124 is designed to engage both lock nut 84 and a shaped portion, such as a hex or flatted section, of the inner tie rod component 80, and includes an open recess 150 that functions as a dual-use socket and a geared outer surface section 152. Dual use socket 150 includes a double-pocketed configuration that is designed to be able to fit around and turn both lock nut 84 and the hex or other shaped portion of inner tie rod component 80 (the shaped portion can be hex-shaped, flatted, or some other shape that is known and used in the art). As is appreciated by those skilled in the art, geared socket 124 first loosens lock nut 84, then adjusts the length of the overall tie rod assembly 20 by turning inner tie rod component 80 so that it threadably interacts with a threaded bore in outer tie rod component 82, and finally tightens lock nut 84 once the tie rod length has been adjusted. As best shown in FIG. 3, geared outer surface section 152 meshes and interacts with internal gears 126 in the gear head so that rotational movement originally provided by nut runner 96 is transferred to the geared socket 124.

In operation, once vehicle 10 is properly positioned and secured over pit 14, movement mechanisms 38, 40 lift tie rod adjustment devices 16, 18 into place so that they can engage tie rod assemblies 20, 22, respectively. Under pressure from cylinder 62, the free-floating adjustable gear head 94 approaches tie rod assembly 20 in a generally transverse direction. As it nears the tie rod, geared socket 124 is in a neutral or open position so that tie rod assembly 20 can be received by recess 150 without fully engaging either lock nut 94 or inner tie rod component 80. As their names suggest, guide forks 120, 122 use open recesses 140, 144 to help guide the gear head 94, which can freely pivot about its connection with housing 90, onto tie rod assembly 20. Once in place, geared socket 124 is slid laterally so that it engages lock nut 84, at which point it loosens the lock nut by rotating it under the force of nut runner 96 (most tie rod assemblies are provide with a tightened lock nut, thus explaining why they need to be loosened first). Next, geared socket 124 disengages from the lock nut and laterally slides over to engage a hex portion of inner tie rod component 80. This engagement enables socket 124 to rotate the inner tie rod component 80, again under the force of nut runner 96, so that the overall length of the tie rod assembly 20 can be adjusted.

As the inner tie rod component 80 rotates, gear head 94 must laterally slide along the length of the tie rod in order to accommodate the changing length of tie rod assembly 20. Roller elements 142 reduce the friction generated between the recesses 140 and 144 of the guide forks and the tie rod components, especially the thicker outer tie rod component 82. In addition to increasing the operating life of the guide forks and making for smoother lateral movement, roller elements 142 reduce "lock-up" conditions that can temporary shut down the station. Once the proper tie rod adjustments have been made, socket portion 124 slides over and once again engages the lock nut 94; only this time, it tightens the lock nut so that the recently-made toe adjustments are locked in place. Finally, the geared socket rotates to an open position and shifts laterally so that tie rod adjustment device 16 can be backed off of tie rod assembly 20 and returned to an out-of-the-way position.

Turning now to FIG. 6, there is shown another embodiment of a tie rod adjustment device 148 that is similar to that just described, but has been modified for use with tie rods having certain spatial or other constraints. Sometimes, the size and/or configuration of a tie rod assembly 170 prevents the use of a large gear head. Thus, tie rod adjustment device 148 includes a gear head 154 where the outer guide fork has been removed so that the gear head is smaller and has better lateral access to tie rod assembly 170. According to this embodiment, adjustable gear head 154 includes a single guide fork 160 and a geared socket 162 that are largely the same as those previously described. Guide fork 160 is positioned on the inner side of socket 162 and engages a hex, flatted or other shaped portion of inner tie rod component 172. However, in order to properly align adjustable gear head 154 with tie rod assembly 170 there generally needs to be at least two gear head components that engage the tie rod. This is because gear head 154 is pivotally mounted to the tie rod adjustment device and is being urged against tie rod assembly 170 by a cylinder (not shown). If gear head 154 does not include at least two engagement and/or alignment features, it can become misaligned with tie rod assembly 170, as demonstrated in FIG. 7. In most embodiments, the pair of guide forks serve this purpose, however, in order to reduce the size of gear head 154 one of the guide forks has been removed, as previously explained.

Therefore, in this embodiment geared socket 162 acts as both a stabilizing feature for engaging and maintaining proper alignment with the tie rod assembly 170, and as a socket for engaging lock nut 176 and inner tie rod component 172. When gear head 154 is initially brought into position, the tie rod assembly 170 nests within the cruxes of the single guide fork 160 and the geared socket 162 such that the gear head is properly aligned. This two-component support and alignment of tie rod assembly 170 is maintained until geared socket 162 is rotated upside-down, at which point the force being exerted by the cylinder can cause the geared socket to slip off of tie rod assembly 170 and play existing between the geared socket 162 and the tie rod assembly can cause a misalignment. Thus, there is a need for some type of mechanism to lock the gear head in place once it is initially aligned with the tie rod assembly, thereby freeing up geared socket 162 so that it can rotate without affecting the alignment.

Locking mechanism 180 locks the adjustable position of gear head 154 in place once it nests on and becomes aligned with tie rod assembly 170; this way, the gear head cannot pivot or otherwise become misaligned with tie rod assembly 170 when geared socket 162 begins to rotate. The locking mechanism shown here generally includes a rigid arm 182 firmly connected to adjustable gear head 154, a brake plate 184, and a brake caliper or retention device 186. Rigid arm 182 is connected to gear head 154 and moves like a pendulum (see arrows in FIG. 6) in response to the pivotal position of the gear head. According to the embodiment shown here, rigid arm 182 and nut runner 196 are connected and move together, however, it should be appreciated that the rigid arm could be independent of the nut runner such that it extends downwards from gear head 154 and swings by itself. Brake plate 184 is preferably a triangular-shaped fin attached to an end of arm 82 so that a lever-effect reduces the amount of force that needs to be exerted by retention device 186. The retention device preferably includes a pair of calipers for clamping and retaining brake plate 184 and can be driven by electric, pneumatic, hydraulic or other means.

In operation, tie rod adjustment device 148 is moved into position so that adjustable gear head 154 can engage vehicle tie rod assembly 170. Initially, geared socket 162 is in an open or neutral position so that the tie rod can properly nest within recesses located in the single guide fork 160 and geared socket 162. As free-floating gear head 154 engages tie rod assembly 170 and pivotally adjusts to a proper alignment, arm 182 moves in response. The retention device 186 then pinches or otherwise engages brake plate 184 so that the rigid arm, and hence the adjustable gear head, are maintained in their current position. Gear head 154 is now unable to become misaligned because the rigid arm 182 extending therefrom is locked in place. Now that the gear head is maintained in a stationary alignment, geared socket 162 can rotatably engage lock nut 176 and inner tie rod component 172, as previously explained.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. For example, although locking mechanism 180 described above uses mechanical retention means for grasping plate 184, other arrangements, such a metallic brake plate and magnetic clamping means, could be used instead. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A gear head for use with a vehicle tie rod adjustment device, wherein said gear head engages a vehicle tie rod assembly and comprises:
   a geared socket having an open recess for engaging a shaped portion or a lock nut of the vehicle tie rod assembly, wherein said geared socket can rotatably adjust the vehicle tie rod assembly component that it engages, and;
   a guide fork located adjacent said geared socket and having an open recess with one or more roller element(s), wherein said roller element(s) facilitate a sliding movement between said guide fork open recess and the vehicle tie rod assembly.

2. The gear head of claim 1, wherein said geared socket further includes a geared outer surface section for operably interacting with internal gears located within said gear head.

3. The gear head of claim 1, wherein said roller element(s) include a plurality of disk-shaped wheels that are spaced around the periphery of said guide fork open recess and are designed to roll along an outer surface of the vehicle tie rod assembly.

4. The gear head of claim 1, wherein said roller element(s) include a plurality of ball bearings that are spaced around the periphery of said guide fork open recess and are designed to roll along an outer surface of the vehicle tie rod assembly.

5. The gear head of claim 1, wherein said gear head further includes an additional guide fork having an open recess so that said geared socket is generally located in between the pair of said guide forks.

6. The gear head of claim 5, wherein said additional guide fork open recess includes one or more roller element(s).

7. A vehicle tie rod adjustment device for adjusting the toe of a vehicle wheel, wherein said device includes a rigid housing, a gear train generally located within said housing, and the gear head of claim 1 adjustably attached to an end of said housing.

8. The vehicle tie rod adjustment device of claim 7, wherein said adjustment device further includes a locking mechanism having an arm extending from said gear head, a plate attached to said arm, and a retention device positioned to engage said plate so that an adjustable position of said gear head can be locked in place.

9. The vehicle tie rod adjustment device of claim 8, wherein said retention device includes brake calipers for firmly retaining said plate in a particular angular orientation.

10. The vehicle tie rod adjustment device of claim 8, wherein said retention device includes an electromagnetic device for firmly retaining said plate in a particular angular orientation.

11. A locking mechanism for use with a vehicle tie rod adjustment device, wherein said locking mechanism maintains an adjustable gear head in a particular position and comprises:
   an arm component rigidly attached to and extending from the gear head, wherein a pivotal movement of the gear head causes a corresponding pivotal movement of said arm component;
   a plate rigidly attached to said arm component at a distance from the gear head, and;
   a retention device rigidly attached to the tie rod adjustment device and positioned to operably interact with said plate, wherein engagement by said retention device of said plate causes the gear head to be locked in a particular angular position.

12. The locking mechanism of claim 11, wherein said arm component extends downwards from the gear head and said plate is attached at a lower end of said arm component.

13. The locking mechanism of claim 11, wherein said plate is a brake plate and said retention device includes brake calipers for firmly retaining said brake plate in place.

14. The locking mechanism of claim 11, wherein said plate is a magnetic plate and said retention device includes an electromagnetic device for firmly retaining said magnetic plate in place.

15. The locking mechanism of claim 11, wherein the gear head includes a single guide fork and a geared socket that engage a tie rod assembly for proper alignment.

16. A vehicle tie rod adjustment device for adjusting the toe of a vehicle wheel, wherein said device includes the locking mechanism of claim 11 and a rigid housing, a gear train generally located within said housing, and a gear head comprising:
   a geared socket having an open recess for engaging a shaped portion or a lock nut of the vehicle tie rod assembly, and;
   a guide fork located adjacent said geared socket and having an open recess with one or more roller element(s), wherein said roller element(s) facilitate a sliding movement between said guide fork open recess and the vehicle tie rod assembly.

17. The vehicle tie rod adjustment device of claim 16, wherein said roller element(s) include a plurality of disk-shaped wheels that are spaced around the periphery of said guide fork open recess and are designed to roll along an outer surface of the vehicle tie rod assembly.

18. The vehicle tie rod adjustment device of claim 16, wherein said roller element(s) include a plurality of ball bearings that are spaced around the periphery of said guide fork open recess and are designed to roll along an outer surface of the vehicle tie rod assembly.

19. A tie rod adjustment station for use on a vehicle assembly line, comprising:
   tracks for supporting a vehicle having a pair of steerable front wheels;
   a wheel alignment sensing device positioned at a location corresponding to a first one of the front wheels, wherein said sensing device outputs information representative of the orientation of the first front wheel;
   a tie rod adjustment device for engaging a tie rod assembly connected to the first front wheel;
   a movement mechanism supporting said tie rod adjustment device so that said adjustment device can be moved into and out of engagement with the tie rod assembly; and
   an electronic control system coupled to said wheel alignment sensing device, said tie rod adjustment device, and said movement mechanism;
   wherein said tie rod adjustment device comprises:
      a nut runner having a driven rotational output;
      a housing;
      a gear train coupled to said driven rotational output of said nut runner, and;
      a gear head, comprising:
         a geared socket coupled to said gear train and having an open recess for engaging a shaped portion or a lock nut of the tie rod assembly; and
         a guide fork located adjacent said geared socket and having an open recess with one or more roller element(s), wherein said roller element(s) facilitate a sliding movement between said guide fork open recess and the vehicle tie rod assembly.

20. The tie rod adjustment station of claim 19, wherein said tie rod adjustment device further includes a locking mechanism having an arm attached to said gear head, a plate attached to said arm, and a retention device for engaging said plate, wherein said locking mechanism maintains said gear head in a particular angular orientation.

* * * * *